United States Patent [19]

Meyborg et al.

[11] 4,383,051

[45] May 10, 1983

[54] PROCESS FOR THE PREPARATION OF POLYURETHANE PLASTICS USING DIANHYDRO-HEXITE DIOLS

[75] Inventors: Holger Meyborg, Odenthal; Kuno Wagner, Leverkusen; James M. Barnes, Wermelskirchen; Herbert Salzburg, Cologne, all of Fed. Rep. of Germany

[73] Assignee: Bayer Aktiengesellschaft, Leverkusen, Fed. Rep. of Germany

[21] Appl. No.: 357,118

[22] Filed: Mar. 11, 1982

[30] Foreign Application Priority Data

Mar. 20, 1981 [DE] Fed. Rep. of Germany ....... 3111093

[51] Int. Cl.$^3$ ...................... C08G 18/14; C08G 18/32
[52] U.S. Cl. .................................... 521/176; 521/174; 528/73; 549/466
[58] Field of Search .................. 521/174, 176; 528/73; 549/466

[56] References Cited

U.S. PATENT DOCUMENTS 4,038,223 7/1977 Pohjola et al. ........................... 260/9
4,098,729 7/1978 Kollmeier et al. ................... 521/128

OTHER PUBLICATIONS

Kunststoffe-Handbuch, vol. VII, Vieweg-Hochtlen, Carl Hanser Verlag, Munich, 1966, pp. 206–213.
Pigman, The Carbohydrates, Academic Press, N.Y., (1957), pp. 384–387.

*Primary Examiner*—H. S. Cockeram
*Attorney, Agent, or Firm*—Gene Harsh; Joseph C. Gil; Richard A. Elder

[57] ABSTRACT

A process for the preparation of homogeneous and cellular polyurethane plastics by the reaction of
   (a) organic polyisocyanates;
   (b) compounds containing at least 2 Zerewitinoff-active hydrogen atoms and having molecular weights of from 400 to 10,000;
   (c) chain extenders, and, optionally, additional
   (d) short-chained compounds containing at least 2 Zerewitinoff-active hydrogen atoms and having a molar mass of from 32 to 400, as well as, optionally,
   (e) catalysts, blowing agents and other known additives, is described, which is characterized in that 1,4-3,6-dianhydro-hexites, preferably 1,4-3,6-dianhydro-D-sorbitol and/or 1,4-3,6-dianhydro-D-mannitol, optionally mixed with lower molecular weight compounds, preferably with polyols having a molecular weight of from 62 to 400, particularly preferably butane diol-1,4 are used as the chain extenders. The new chain extenders produce high quality elastomers and foams.

9 Claims, No Drawings

PROCESS FOR THE PREPARATION OF POLYURETHANE PLASTICS USING DIANHYDRO-HEXITE DIOLS

This invention relates to a process for the preparation of polyurethane plastics, which may be cellular, using, as chain extenders, diols based on the dianhydro-hexite series (isohexitols).

BACKGROUND OF THE INVENTION

The use of short-chained diols as chain extenders during the preparation of polyurethane plastics is known. Certain combinations of isocyanate and chain extender, of the type described, for example, in Kunststoff-Handbuch, Vol. VII, Vieweg-Hochtlen, Carl Hanser Verlag, Munich, 1966 on pages 206 through 213 or in High Polymers, Vol. VXI, "Polyurethanes, Chemistry and Technology", compiled by Saunders-Frisch, Interscience Publishers, New York, London, Parts I and II, have proven to be particularly suitable for the preparation of polyurethane plastics having excellent physical properties. Such combinations include the 1,5-diisocyanatonaphthalene/1,4-butane diol and 4,4'-diisocyanato diphenylmethane/hydroquinone-bis-(2-hydroxyethyl)-ether. Chain extension using 2,3-butane diol in conjunction with 1,5-diisocyanatonaphthalene also produces high quality plastics.

The high reactivity of the conventional chain extenders leads to very short pot lives, particularly in systems having a large rigid segment content, so that it is not always possible to process them into molded articles without experiencing difficulties. In addition, the large quantities of heat evolved during an excessively fast reaction with the chain extender can lead to the formation of inhomogeneities and cracks in the finished molded article, which, of course, have detrimental effects on the properties of the product.

It has now been found that by adopting known processes, polyurethane plastics having good physical properties and an adjustable pot life can be prepared if 1,4-3,6-dianhydro-hexites are used as chain extenders. It is surprising that the complete replacement of non-cyclic chain extenders in cast elastomer systems with 1,4-3,6-dianhydro-hexites leads to polyurethane plastics which are not only comparable in quality but are much better in some parameters, such as tear-propagation-resistance and structural strength. In view of the completely different structure of the chain extenders according to the present invention and the known sensitivity of polyurethane elastomers toward structural changes in the rigid segment, this result was not anticipated.

Moreover, it was also surprising that high quality polyurethane plastics could be produced by using mixtures of various 1,4-3,6-dianhydro-hexites in any proportions, either with each other or with other diols as chain extenders. Mixtures of extenders generally lead to inhomogeneities in the rigid segment and thus, to poorer physical cross-linking of the plastic and the consequent disadvantages with respect to quality.

An improvement advantage in terms of processing of the above-mentioned mixtures is that they are liquid at room temperature. This simplifies the application of the chain extender considerably as previous melting is omitted.

DESCRIPTION OF THE INVENTION

The present invention relates to a process for the preparation of polyurethane plastics which may be cellular comprising reacting:
(a) organic polyisocyanates;
(b) compounds having molecular weights of from 400 to 10,000 and containing at least 2 Zerewitinoff-active hydrogen atoms;
(c) chain extenders;
(d) optionally, short-chained compounds having molecular weights of from 32 to 400 and containing at least 2 Zerewitinoff-active hydrogen atoms; and
(e) optionally, catalysts, blowing agents and further known additives, characterized in that 1,4-3,6-dianhydro-hexites, preferably 1,4-3,6-dianhydro-D-sorbitol corresponding to the formula:

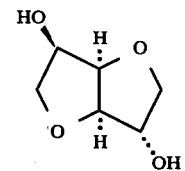

and/or 1,4-3,6-dianhydro-D-mannitol corresponding to the formula:

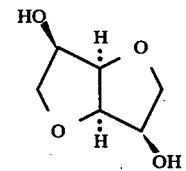

and/or mixtures of dianhydro sorbitol and dianhydro mannitol are used as component (c). The hexites may be mixed with lower molecular compounds (d), and are preferably mixed with butane diol-1,4.

Useful isocyanates include aliphatic, cycloaliphatic, araliphatic and aromatic polyisocyanates of the type described, for example, by W. Siefken in Justus Liebigs Annalen der Chemie, 562, pages 75 to 136. Such isocyanates may, for example, be those corresponding to the formula Q (NCO)$_n$ wherein n represents 2 to 4, preferably 2, and Q represents an aliphatic hydrocarbon radical having from 2 to 18, preferably from 6 to 10 carbon atoms; a cycloaliphatic hydrocarbon radical having from 4 to 15, preferably from 5 to 10 carbon atoms; an aromatic hydrocarbon radical having from 6 to 15, preferably from 6 to 13 carbon atoms; or an araliphatic hydrocarbon radical having from 8 to 15, preferably from 8 to 13 carbon atoms.

Suitable specific isocyanates include 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl-cyclohexane (German Auslegeschrift No. 1,202,785; U.S. Pat. No. 3,401,190); 2,4- and 2,6-hexahydrotoluylene diisocyanate and mixtures of these isomers; hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-toluylene diisocyanate and mixtures of these isomers; diphenylmethane-2,4'- and/or -4,4'-diisocyanate; 3,3'-dimethyl-4,4'-diisocyanato-biphenyl and naphthylene-1,5-diisocyanate.

Other suitable polyisocyanates (preferably diisocyanates) are described in German Offenlegungsschrift No. 2,920,501, page 13, line 13 to page 16. Of course, it is also possible to use mixtures of any of these polyisocyanates.

Preferred polyisocyanates include those polyisocyanates which are readily commercially available, such as, for example 2,4- and 2,6-toluylene diisocyanate as well as any mixtures of these isomers (TDI); polyphenol polymethylene polyisocyanates, of the type produced by aniline formaldehyde condensation and subsequent phosgenation (crude MDI); 4,4-diphenylmethane diisocyanate (MDI); 3,3'-dimethyl-4,4'-diisocyanatobiphenyl; and 1,5-naphthylene diisocyanate. 4,4'-diphenylmethane diisocyanate and 1,5-naphthylene diisocyanate are particularly preferred. Suitable isocyanate-reactive compounds with at least 2 Zerewitinoff-active hydrogen atoms and which generally have molecular weights of from 400 to 10,000 include, in addition to compounds containing amino groups, thiol groups or carboxyl groups, preferably compounds containing hydroxyl groups, and in particular compounds containing from 2 to 8 hydroxyl groups, especially those having molecular weights of from about 800 to 10,000, preferably from 1,000 to 6,000. These include, for example, polyesters, polyethers, polythioethers, polyacetals, polycarbonates and polyesteramides containing at least 2, generally from 2 to 8, but preferably, from 2 to 4 hydroxyl groups, of the type known for the preparation of homogeneous and of cellular polyurethanes.

Suitable polyesters containing hydroxyl groups include, for example, reaction products of polyhydric, preferably dihydric, and optionally, also trihydric and tetrahydric alcohols, with polybasic, preferably dibasic carboxylic acids. The polycarboxylic acids can be of an aliphatic, cycloaliphatic, aromatic and/or heterocyclic type and can optionally be unsaturated and/or substituted, for example, by halogen atoms. Also, the corresponding polycarboxylic anhydrides or corresponding polycarboxylic acid esters of lower alcohols or mixtures thereof can be used instead of the free polycarboxylic acids for the preparation of the polyesters.

Examples of suitable polycarboxylic acids and derivatives thereof include adipic acid, sebacic acid, phthalic acid, phthalic acid anhydride, tetrahydro or hexahydrophthalic acid anhydride, isophthalic acid, trimellitic acid, maleic acid anhydride, dimerized and trimerized unsaturated fatty acid, terephthalic acid dimethyl ester and terephthalic acid-bis-glycol ester.

Suitable polyhydric alcohols include, for example, ethylene glycol, propylene glycol, butanediol-1,4 and/or -2,3, hexanediol-1,6, neopentyl glycol, 1,4-bis-hydroxymethyl cyclohexane, and 2-methyl-1,3-propane diol. Further examples include glycerine, trimethylolpropane, hexane triol-1,2,6, pentaerythritol, quinitol, mannitol and sorbitol, formitol, methyl glycosite, also di-, tri-, tetra- and higher polyethylene-, polypropylene- and polybutylene glycols.

The polyesters may also contain some terminal carboxyl groups. Polyesters from lactones, for example, ε-caprolactone or hydroxycarboxylic acids, for example, ε-hydroxycaproic acid, may also be used.

Suitable polyethers containing at least 2, generally from 2 to 8, preferably from 2 to 3 hydroxyl groups, which may be used according to the invention include those of a known type. These polyethers are produced, for example, by polymerization of epoxides, such as ethylene oxide, propylene oxide, butylene oxide, tetrahydrofuran, styrene oxide or epichlorohydrin, with themselves (for example, in the presence of Lewis catalysts), or by addition of these epoxides, preferably ethylene oxide and propylene oxide, optionally in a mixture or successively, to starting components with reactive hydrogen atoms. Such starting components include water, alcohols, ammonia or amines. Specific starters include, for example, ethylene glycol, propylene glycol, diethylene glycol, dimethylolpropane, glycerine, sorbitol, sucrose, formitol or formose, as well as 4,4'-dihydroxydiphenyl propane, aniline, ethylene diamine or ethanol amine.

Polythioethers, polybutadienes, polyacetals, polycarbonates or polyester amides containing OH-groups are also usable starting materials.

Polyhydroxyl compounds containing high-molecular-weight polyadducts or polycondensates or polymers in finely dispersed or dissolved form can also, optionally, be used according to the invention. These polyhydoxyl compounds are obtained, for example, if polyaddition reactions (for example, reactions between polyisocyanates and aminofunctional compounds) or polycondensation reactions (for example, between formaldehyde and phenols and/or amines) are allowed to take place in situ in the above-mentioned compounds containing hydroxyl groups. Polyhydroxyl compounds modified by vinyl polymers of the type produced, for example, by polymerization of styrene and/or acrylonitrile in the presence of polyethers or polycarbonate polyols are also suitable for the process according to the invention. Representative examples of those higher-molecular-weight polyhydroxyl compounds for use according to the invention are known and are listed, for example, in High Polymers, Vol. XVI, "Polyurethanes, Chemistry and Technology", compiled by Saunders-Frisch, Interscience, Publishers, New York, London, Section I, 1962, pages 32 to 42 and pages 44 to 54 and Section II, 1964, pages 5 to 6 and 198 to 199; in Kunststoff-Handbuch, Volume VII, Vieweg-Hochtlen, Carl Hanser Verlag, Munich 1966, for example, on pages 45 to 71; and, in particular, in German Offenlegungsschrift No. 2,920,501, pages 17 to 24. Mixtures of the above-mentioned compounds, for example, mixtures of polyethers and polyesters can also, obviously, be used.

Polyhydroxyl compounds already containing urethane or urea groups, as well as optionally modified natural polyols, such as castor oil or carbohydrates, for example, starch, may also be used. Furthermore, addition products of alkylene oxides to phenol formaldehyde resins or also to urea formaldehyde resins may be used according to the invention.

The chain-extenders of the present invention include compounds from the series of 1,4-3,6-dianhydro-hexites corresponding to the general formula:

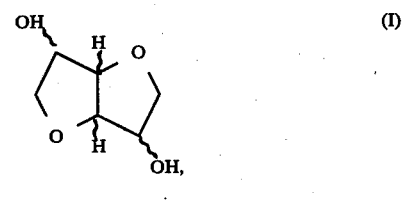

with 1,4-3,6-dianhydro-D-sorbitol (Formula II) and 1,4-3,6-dianhydro-D-mannitol (Formula III) being preferred.

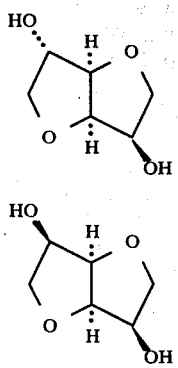

Obviously, the chain extenders according to the invention may also be used in the form of mixtures in any proportions.

Additionally, mixtures of these bisanhydrohexites with other short-chained compounds having molecular weights of from 32 to 400 and containing 2 to 8, preferably, from 2 to 4, hydrogen atoms capable of reacting with isocyanates (chain extender (d)) may also be used according to the invention. Particularly preferred are mixtures of 1,4-3,6-dianhydro-hexites with lower molecular weight diols, particularly 1,4-butane diol.

Suitable chain extenders which can be combined with the hexites include compounds containing hydroxyl groups and/or amino groups and/or thiol groups and/or carboxyl groups, preferably hydroxyl groups and/or amino groups. Preferred are lower molecular polyols and/or aminoalcohols having a molecular weight of from 62 to 400. Examples of these compounds include ethylene glycol, propylene glycol-(1,2) and -(1,3), butylene glycol-(1,4) and -(2,3), pentane diol-(1,5), hexane diol-(1,6), octane diol-(1,8), neopentyl glycol, 1,4-bis-hydroxymethyl-cyclohexane, 2-methyl-1,3-propane diol, dibromo-butene diol (U.S. Pat. No. 3,723,392). Additionally, glycerine, trimethylolpropane, hexane triol-(1,2,6), trimethylol-ethane, pentaerythritol, quinitol, mannitol and sorbitol, castor oil, diethylene glycol, triethylene glycol, tetraethylene glycol, higher polyethylene glycols with a molecular weight of up to 400, dipropylene glycol, and higher polypropylene glycols with a molecular weight up to 400 may be used. Further examples include dibutylene glycol, higher polybutylene glycols with a molecular weight of up to 400, 4,4'-dihydroxy phenyl propane, dihydroxyethyl hydroquinone, ethanolamine, diethanolamine, n-methyldiethanolamine, triethanolamine and 3-aminopropanol.

Suitable lower molecular weight polyols according to the invention also include mixtures of hydroxy aldehydes and hydroxy ketones ("Formose") or the polyhydric alcohols ("Formitol"). In order to obtain plastics having an improved flame-resistance, these formoses are advantageously used in combination with aminoplast-forming agents and/or phosphites (German Offenlegungschriften Nos. 2,738,513 and 2,738,532). Solutions of polyisocyanate polyaddition products, in particular of polyurethane ureas containing ionic groups and/or of polyhydrazodicarbonamides, in lower molecular weight polyhydric alcohols, can also be used as the polyol component according to the invention (German Offenlegungsschrift No. 2,638,759).

Suitable aliphatic diamines according to the invention include, for example, ethylene diamine, 1,4-tetramethylene diamine, 1,11-undecamethylene diamine, 1,12-dodecamethylene diamine and mixtures thereof, and 1-amino-3,3,5-trimethyl-5-amino methyl cyclohexane ("isophorone diamine"). Additional examples include 2,4- and 2,6-hexahydrotolylene-diamine and mixtures thereof, perhydro-2,4'- and -4,4'-diaminodiphenylmethane, p-xylylenediamine, bis-(3-aminopropyl)-methylamine, diamino-perhydroanthrazenes and cycloaliphatic triamines (according to German Offenlegungsschrift No. 2,614,244). Hydrazine and substituted hydrazines, as well as acid dihydrazides, may also be used according to the invention. Examples of these include carbodihydrazide, oxalic acid dihydrazide, the dihydrazides of malonic acid, succinic acid, glutaric acid, adipic acid, hydracrylic acid, terephthalic acid; semicarbazido-alkylene-hydrazides, semicarbazido-alkylene carbazine esters, and also, amino semicarbazide compounds. To control the reactivity thereof, the amino groups may be blocked completely or partially by $CO_2$ in the form of the carbonates thereof, or by aldimine or ketimine groups.

Examples of suitable aromatic diamines include bisanthranilic acid esters (according to German Offenlegungsschriften Nos. 2,040,644 and 2,160,590); 3,5- and 2,4-diaminobenzoic acid esters (according to German Offenlugungsschrift No., 2,025,900); diamines containing ester groups; diamines containing ether groups; and 2-halogen-1,3-phenylene diamines, optionally substituted in the 5-position. Further, 3,3'-dichloro-4,4'-diaminodiphenylmethane; toluylene diamines; 4,4'-diaminodiphenylmethane; 4,4'-diaminodiphenylsulphide; diaminodiphenyldithioether; aromatic diamines substituted by alkylthio groups; diaminobenzene phosphoric acid esters; aromatic diamines containing sulphonate or carboxylate groups; as well as the high-melting diamines (mentioned in German Offenlegungsschrift No. 2,635,400) may also be used. Examples of aliphatic-aromatic diamines include aminoalkyl thio-anilines.

Additionally, compounds such as 1-mercapto-3-amino-propane; optionally-substituted amino acids, such as glycine, alanine, valine, serine and lysine; as well as optionally-substituted dicarboxylic acids, such as succinic acid, adipic acid, phthalic acid, 4-hydroxy phthalic acid and 4-amino phthalic acid may also be used according to the invention.

Further lower molecular weight polyols which are suitable according to the invention and have a molecular weight of up to 400 include esterdiols such as, for example, δ-hydroxybutyl-ε-hydroxy-caproic acid ester, ω-hydroxy-hexyl-α-hydroxybutyric acid ester, adipic acid-bis-(β-hydroxyethyl)-ester and terephthalic acid-bis-(β-hydroxyethyl)-ester. Also, diol urethanes, for example, 1,6-hexamethylene-bis-(β-hydroxyethyl urethane) or 4,4'-diphenylmethane-bis-(δ-hydroxybutyl urethane); as well as diol ureas, for example, 4,4'-diphenylmethane-bis-(β-hydroxyethyl urea) may be used.

Additional suitable chain extenders of this type are described, in detail, in German Offenlegungsschrift No. 2,854,384 on page 20, line 1 to page 26, line 5.

For some purposes, it is advantageous to use polyols containing sulphonate and/or phosphonate groups (German Offenlegungsschrift No. 2,719,372), preferably the adduct of bisulphite to butane diol-1,4, or the alkoxylation products thereof.

Compounds which are monofunctional toward isocyanates may also be used in proportions of from 0.01 to 10%, by weight, based on the polyurethane solid, as so-called chain breakers. Monofunctional compounds of this type include, for example, monoamines, such as butyl and dibutylamine, octylamine, stearylamine, n-methylstearylamine, pyrrolidine, piperidine and cyclohexylamine, monoalcohols such as butanol, 2-ethylhexanol, octanol, dodecanol, the various amyl alcohols, cyclohexanol, ethylene glycol monoethyl ether or diisopropyl cerbinol.

In the functionality of the starting isocyanates and/or hydroxyl or amine components is greater than 2, polyurethane plastics which are no longer thermoplastic are obtained and cellular polyurethanes such as foams are preferably prepared from them.

Although the use of 1,4-3,6-dianhydro-hexites and mixtures thereof has the advantage of a longer pot life, it may be advantageous optionally to use additional auxiliaries and additives. These include catalysts for the reaction between hydroxyl and isocyanate groups, preferably those of a type known per se in polyurethane chemistry. Examples of suitable catalysts include tertiary amines, such as triethylamine; n-tetramethyl ethylenediamine; 1,4-diaza bicyclo-(2,2,2)-octane; N,N-dimethyl benzylamine; N-methyl-N'-dimethylaminoethyl piperazine; and pentamethyl diethylene triamine. Additionally, Mannich bases from secondary amines, known as catalysts, such as dimethylamine and aldehydes (formaldehyde) or ketones (acetone) and phenols; and Sila amines with carbon-silicon bonds, for example 2,2,4-trimethyl-2-silamorpholine and 1,3-diethylaminomethyl-tetramethyl disiloxane may be used. Organic metal compounds, in particular, organic tin compounds, for example tin-(II)-acetate, tin-(II)-ethyl hexoate and the tin-(IV)-compounds, including dibutyl tin dichloride, dibutyl tin dilaurate, and dibutyl tin maleate may also be used according to the invention as catalysts. Other suitable catalysts are described in German Offenlegungsschrift No. 2,920,501 on page 29, line 5 to page 31, line 25. Tin-(II)-carboxylic acid salts, triethylene diamine and titanic acid ester are particularly suitable catalysts and all catalysts may be used in the form of mixtures. The catalysts are preferably used in a quantity of between 0.001 and 10% by weight based on the total weight of components (b), (c) and (d).

Reaction retarders, such as hydrochloric acid or organic acid halides; known cell regulators such as paraffins and fatty alcohols or dimethyl polysiloxanes; pigments or dyes; known flame-proofing agents, for example, tris-chloroethylphosphate, tricresyl phosphate or ammonium phosphate and polyphosphate; stabilizers against ageing and weathering factors; plasticizers and fungistatically- and bacteriostatically-acting substances; as well as fillers, such as barium sulphate, diatomaceous earth, carbon black and prepared chalk, may also be used.

Blowing agents, such as water and/or readily-volatile organic substances if cellular polyurethane plastics are to be produced by the process according to the invention may also be used. Suitable organic blowing agents include acetone; ethyl acetate; halogen-substituted alkanes, such as methylene chloride; chloroform; ethylidene chloride, vinylidene chloride; monofluorotrichloromethane; chloride fluoromethane; dichlorodifluoromethane; butane; hexane; heptane; and diethylether. A blowing effect can also be achieved by the addition of compounds which decompose at temperatures above room temperature, evolving gases, such as nitrogen. Other examples of blowing agents, as well as details about their use, are described in the Kunststoff-Handbuch, Vol. VII, edited by Vieweg and Hochtlen, Carl Hanser Verlag, Munich 1966, for example, on pages 108 and 109, 453 to 455 and 507 to 510, and in German Offenlegungsschrift No. 2,920,501.

Surface-active additives such as emulsifiers and foam stabilizers, can also be used in accordance with the invention. Suitable emulsifiers include, for example, the sodium salts of castor oil sulphonates and salts of fatty acids, with amines such as oleic acid diethyl amine and stearic acid diethanol amine. Alkali or ammonium salts of sulphonic acids, for example, of dodecyl-benzene sulphonic acid or dinaphthyl methane disulphonic acid, or of fatty acids, such as ricinoleic acid, or of polymeric fatty acids may also be used as surface-active additives.

Polyether siloxanes, particularly those which are water-soluble, may be used as foam stabilizers. These compounds are generally compounded such that a copolymer of ethylene oxide and propylene oxide is bonded to a polydimethyl siloxane radical. Foam stabilizers of this type are described, for example, in U.S. Pat. Nos. 2,834,748; 2,917,480 and 3,629,308.

Examples of surface-active additives and foam stabilizers, as well as cell regulators, reaction retarders, flame-retarding substances, plasticizers, dyes and fillers, and fungistatically- and bacteriostatically-active substances, as well as details about the method of using and mode of operation of these additives, which may optionally be used according to the invention, are described in Kunststoff-Handbuch, Vol. VII, edited by Vieweg and Hochtlen, Carl Hanser Verlag, Munich 1966, for example, on pages 103 to 113, and in German Offenlegungsschrift No. 2,920,501.

The process according to the invention is generally carried out by reacting the reaction components by the known single stage process, the prepolymer process, or the semiprepolymer process. Mechanical devices, such as those described in U.S. Pat. No. 2,764,565, are often used with details about these devices contained in Kunststoff-Handbuch, Vol. VII, edited by Vieweg and Hochtlen, Carl Hanser Verlag, Munich 1966, for example on pages 121 to 247.

The quantities of the reaction components are generally selected such that the molar ratio of polyisocyanates to chain extenders plus compounds with reactive OH-groups (depending on the respective processing method adopted) generally lies between 0.9 and 1.5, preferably between 1.05 and 1.25. The percentage of NCO in the prepolymer can be from 1 to 8%, and preferably from 2 to 6%, by weight, if the operation is carried out over the prepolymer stage. The molar ratio of reactive hydrogen in the chain extender to reactive OH-groups can vary within wide limits, but it should preferably lie between 0.4 and 1.5, resulting in flexible to rigid polyurethane types.

Another embodiment involves reacting the higher molecular compound with at least two hydroxyl groups in a mixture with the chain extender in an excess of diisocyanate, and shaping the reaction product under pressure with heat after granulation. Depending on the proportions of reactants used, it is thereby possible to obtain polyurethane plastics of varying rigidity and varying elasticity. In this way, it is also possible to prepare plastics which can be processed in the same way as thermoplastics. Still another embodiment involves reacting the higher molecular compound with at least two hydroxyl groups in a mixture with the chain extender to be used according to the invention with a deficit of diisocyanate so that a sheet suitable for rolling is obtained which can subsequently be converted into an elastomeric polyurethane plastic, e.g. by cross-linking with further diisocyanate.

Elastomers prepared according to the invention can be used for many applications, for example, for molded articles subjected to high mechanical stresses, such as rollers, V-belts or seals which are subjected to high thermal or chemical stresses, for hot water pipes or motors or for the production of films, textile coatings and powdered polyurethanes. Cellular polyurethanes (flexible to rigid foams) can also be produced in addition to homogeneous elastomers.

The following Examples illustrate the process according to the invention. Numerical values should be interpreted as parts by weight or percentages by weight, unless otherwise indicated.

EXAMPLE 1

250 parts of a polyester consisting of adipic acid and ethylene glycol with an average molecular weight of 2000 and an OH-numer of 56 are freed from water at 120° C. and a vacuum of 14 mbar.

44.63 parts of 1,5-diisocyanato naphthalene are added and the temperature is maintained at 130° C. for 30 minutes. A previously-melted mixture of 8.05 parts of 1,4-3,6-dianhydro-D-sorbitol and 0.036 parts of tin-(II)-octoate is then added to the prepolymer with vigorous stirring at 110° C. The mixture is stirred for 30 seconds and then poured into a mold preheated to 110° C. The mixture remains pourable for five minutes. It is tempered for a further 24 hours at 110° C. The finished elastomer has the following properties:

$\sigma$100: 3.41 MPa; Tensile strength: 32.9 MPa; Elongation at tear: 664%; Tear-resistance: 498 N; Shore-hardness (A): 75; Elasticity: 40.

EXAMPLE 2

250 parts of the polyester of Example 1 are freed from water as described in Example 1 and prepolymerized with 52.2 parts of diisocyanato naphthalene. A previously melted mixture of 9.83 parts of 1,4-3,6-dianhydro-D-sorbitol and 0.018 parts of tin octoate is stirred in at 100° C. After 30 seconds, the mixture is poured into a mold preheated to 110° C. The mixture remains pourable for six minutes. After tempering for 24 hours at 110° C., an elastomer having the following properties is obtained:

$\sigma$100: 5.23 MPa; Tensile strength: 32.5 MPa; Elongation at tear: 603%; Tear-resistance: 507 N; Shore (A): 86; Elasticity: 43.

EXAMPLE 3

The same prepolymer as in Example 2 is produced and reacted with a mixture of 12.69 parts of 1,4-3,6-dianhydro-D-sorbitol and 0.018 parts of tin octoate and poured into a mold as described in Example 2. The mixture remains pourable for 6 minutes. The mixture is tempered for a further 24 hours at 110° C. The properties of the elastomer are as follows:

$\sigma$100: 4.37 MPa; Tensile strength: 31.8 MPa; Elongation at tear: 564%; Tear-resistance: 535 N; Shore (A): 85; Elasticity: 40.

EXAMPLE 4

The preparation of the prepolymer as well as the remaining mode of operation is identical to Example 3. A mixture of 2.54 parts of 1,4-3,6-dianhydro-D-sorbitol and 6.26 parts of 1,4-butane diol with 0.018 parts of tin octoate is used as chain extender. The mixture is pourable for 4 minutes. The elastomer has the following properties after being thoroughly heated:

$\sigma$100: 4.52 MPa; Tensile strength: 30.2 MPa; Elongation at tear: 599%; Tear-resistance: 513 N; Shore (A): 85; Elasticity: 47.

EXAMPLE 5

250 parts of the polyester of Example 1 are freed from water at 130° C. and a pressure of 14 mbar. 44.36 parts of 1,5-diisocyanato naphthalene are then added and the temperature is kept at 130° C. for 30 minutes. The mixture is cooled to 110° C. and a previously-melted mixture of 4.83 parts of 1,4-3,6-dianhydro-D-sorbitol, 3.22 parts of 1,4-3,6-dianhydro-D-mannitol and 0.036 parts of tin octoate are stirred in. After 30 seconds, the mixture is poured into a mold preheated to 110° C. The mixture remains pourable for 4 minutes. It is tempered for 24 hours at 110° C. An elastomer having the following properties is obtained:

$\sigma$100: 2.42 MPa; Tensile strength: 28.4 MPa; Elongation at tear: 625%; Tear-resistance: 630 N; Shore (A): 72 Elasticity: 49.

EXAMPLE 6

The same prepolymer as in Example 5 is prepared. A melted mixture of 8.05 parts of 1,4-3,6-dianhydro-D-mannitol and 0.018 parts of tin octoate are stirred in at 110° C. After 30 seconds, the mixture is poured into a mold preheated to 110° C. The mixture remains pourable for 2 minutes. The mixture is tempered for 24 hours at 110° C., and an elastomer having the following values is obtained:

$\sigma$100: 3.24 MPa; Tensile strength: 26.8 MPa; Elongation at tear: 632%; Tear-resistance: 740 N; Shore (A): 77; Elasticity: 43.

EXAMPLE 7

200 parts of a mixed polyester composed of adipic acid, ethylene glycol and 1,4-butane diol with an average molecular weight of 2000 and an OH-number of 56 are freed from water for 30 minutes at 11 mm. 80 parts of 1,5-diisocyanatonaphthalene are added and the mixture is kept at 130° C. for 30 minutes before being cooled to 110° C. A previously-melted mixture of 34 parts of 1,4-3,6-dianhydro-D-sorbitol and 0.067 parts of triethylene diamine (DABCO*) are stirred in. The mixture is poured into a mold after 30 seconds. The mixture remains pourable for 2 minutes. The product which is tempered for 24 hours at 110° C. has the following properties:

$\sigma$100: 12 MPa; Tensile strength: 22.7 MPa; Elongation at tear: 312%; Tear-resistance: 633 N; Shore (A): 95; Elasticity: 39.

EXAMPLE 8

The same prepolymer as in Example 7 is prepared and reacted with a molten mixture of 20.4 parts of 1,4-3,6-dianhydro-D-sorbitol, 13.6 parts of 1,4-3,6-dianhydro-D-mannitol and 0.067 parts of DABCO* and is then poured into a mold. The mixture remains pourable for 3 minutes. It is tempered for 24 hours at 110° C. and an elastomer having the following properties is obtained:
$\sigma$100: 12.2 MPa; Tensile strength: 21.0 MPa; Elongation at tear: 252%; Tear-resistance: 643 N; Shore (A): 97; Elasticity: 38.

EXAMPLE 9

The prepolymer from Example 7 is prepared and reacted, according to the procedure of Example 7, with a molten mixture of 34 parts of 1,4-3,6-dianhydro-D-mannitol and 0.67 parts of DABCO* and then poured into a mold. The mixture remains pourable for 2 minutes. The finished elastomer has the following characteristics:
$\sigma$100: 12.6 MPa; Tensile strength: 22.7 MPa; Elongation at tear: 346%; Tear-resistance: 653 N; Shore (A): 95; Elasticity: 44.

EXAMPLE 10

A liquid mixture of 50.9 parts of 1,4-3,6-dianhydro-D-sorbitol, 40.9 parts of 1,4-3,6-dianhydro-D-mannitol and 9.1 parts of 1,4-butane diol is prepared. After freezing ten times to $-20°$ C. and heating to room temperature, no crystallization of any of the components can be observed. A viscosity of 1011 cP (22° C.) is measured at a density of 1.3 g. $cm^{-3}$.

EXAMPLE 11

0.67 parts of DABCO* are added to 32.18 parts of the mixture prepared of Example 10. This mixture is reacted, according to the procedure of Example 7, with the prepolymer from Example 7. This mixture is pourable for 6 minutes. The finished elastomer has the following characteristics:
$\sigma$100: 11.1 MPa; Tensile strength: 21.5 MPa; Elongation at tear; 311%; Tear-resistance; 587 N; Shore (A): 93; Elasticity: 36.

EXAMPLE 12

250 parts of a polyether started on propylene glycol and prepared with propylene oxide with an average molecular weight of 2000 and an OH-number of 56 are freed from water at 130° C. and 14 mbar. 93.75 parts of 4,4'-diisocyanato-diphenylmethane are added at 130° C. and the mixture is stirred for 30 minutes. It is then cooled to 100° C. and a molten mixture of 31.52 parts of 1,4-3,6-dianhydro-D-sorbitol and 0.054 parts of tin octoate are stirred in. After 30 seconds, the mixture is poured into a mold preheated to 110° C. The mixture remains pourable for 12 minutes. The mixture is tempered for 24 hours at 110° C. and an elastomer having the following values is obtained:
$\sigma$100: 4.38 MPa; Tensile strength: 8.40 MPa; Elongation at tear: 315%; Tear-resistance: 199 N; Shore (A): 82; Elasticity: 44.

The period mentioned in Examples 1 to 12 is the maximum possible pouring time, in which the mixture is so thinly liquid that it draws threads during the immersion and subsequent removal of a thin wooden rod.

The following examples illustrate the influence of various catalysts on the pot life.

EXAMPLE 13

100 parts of the polyester of Example 1 are mixed with 1 part of trimethylol propane at 140° C. 40 parts of 1,5-diisocyanato naphthalene are then added and stirred for 2 minutes. 16.2 parts of dianhydro-sorbitol are then stirred into the prepolymer, without a catalyst, in the form of a melt. The reaction mixture has such a low viscosity for 20 minutes that it can be poured and solidifies after about 60 minutes. An elastomer prepared in this way has the following characteristics after tempering at 110° C.
$\sigma$100: 11.3 MPa; Breaking stress: 41 MPa; Breaking elongation: 481%; Shore (A): 96; Elasticity: 34.

EXAMPLE 14

100 parts of a mixed polyester composed of ethylene glycol, 1,4-butane diol and adipic acid with an average molecular weight of 2000 and an OH-number of 56 are reacted as in Example 13 with 40 parts of 1,5-diisocyanato-naphthalene and 17 parts of dianhydro-sorbitol without the addition of a catalyst. This results in an effective pouring time of 9 minutes and a setting time of 2.5 hours. The elastomer prepared in this way has the following properties after tempering:
$\sigma$100: 10.2 MPa; Breaking stress: 20 MPa; Breaking elongation: 506%; Shore (A): 96; Elasticity: 36.

EXAMPLE 15

The formulation from Example 14 is used, with the addition of 0.026 parts of DABCO* to the dianhydrosorbitol. The effective pouring time is 3 minutes in this case and the setting time 6 minutes. After tempering, the elastomer has the following properties;
$\tau$100: 11.9 MPa; Breaking stress: 43 MPa; Breaking elongation: 480%; Shore (A): 95, Elasticity: 36.

EXAMPLE 16

The formulation from Example 14 is used, with the addition of 0.005 parts of dibutyl tin dilaurate to the dianhydro-sorbitol. This results in an effective pouring time of 12 minutes and a setting time of 35 minutes. The mechanical properties after tempering are as follows:
$\sigma$100: 11.4 MPa; Breaking stress: 35 MPa; Breaking elongation: 494%; Shore (A): 96; Elasticity: 37.

EXAMPLE 17

A pouring time of 2 minutes and a setting time of 4 minutes are obtained by increasing tenfold the quantity of catalyst in Example 16. The elastomer has the following properties:
$\sigma$100: 11.0 MPa; Breaking stress: 26 MPa; Breaking elongation: 485%; Shore (A): 96; Elasticity; 35.

EXAMPLE 18

The formulation from Example 14 is used, with the addition of 0.004 parts of titanium tetrabutylate to the dianhydro sorbitol. A pouring time of 6 minutes and a setting time of 20 minutes are thus adjusted. The elastomer has the following properties:
$\sigma$100: 11.2 MPa; Breaking stress: 34 MPa; Breaking elongation: 504%; Shore (A): 97; Elasticity: 36.

EXAMPLE 19

A pouring time of 2.5 minutes and a setting time of 5 minutes are obtained by trebling the quantity of catalyst in Example 18. This results in the following properties:
$\sigma$100: 11.3 MPa; Breaking stress: 24 MPa; Breaking elongation: 460%; Shore (A): 96; Elasticity: 36.

EXAMPLE 20

The prepolymer from Example 14 is reacted with 17 parts of 1,4-3,6-dianhydro mannitol without a catalyst. This results in an effective pouring time of 17 minutes and a setting time of 240 minutes. The data of the elastomer are:

σ100: 11.4 MPa; Breaking stress: 25 MPa; Breaking elongation: 385%; Elasticity: 40.

EXAMPLE 21

When the formulation from Example 20 is catalyzed with 0.026 parts of DABCO*, a pouring time of 1 minute and a setting time of 4 minutes, as well as the following properties, are obtained:

σ100: 11.2 MPa; Breaking stress: 28 MPa; Breaking elongation: 526%; Elasticity: 41.

In Examples 1 to 12, the indicated test values were determined on a ring in accordance with DIN 53 504, and the values for Examples 13 to 21 were obtained on a rod in accordance with DIN 53 504. In all Examples, the rigidity and elasticity were measured in accordance with DIN 53 505 and 53 512.

EXAMPLE 22

Preparation of a cellular polyurethane plastic.

90 parts of a mixed polyester composed of ethylene glycol, 1,4-butane diol and adipic acid with an average molecular weight of 2000 and an OH-number of 56 are mixed with 1.5 parts of castor oil and 0.005 of citric acid and heated to 132° C. 24 parts of 1,5-diisocyanato naphthalene are then added and the mixture is stirred for 15 minutes at 110°-130° C. The mixture is cooled to 90° C. and the prepolymer is first reacted with 1.5 parts (2,6-2',6'-tetraisopropyl)-diphenylcarbodiimide and then with a mixture of 1.075 parts of water, 1.075 parts of a fatty acid sulphonate as emulsifier and 0.7 parts of 1,4-3,6-dianhydro-D-sorbitol. The mixture is allowed to react to completion in a closed mold and a cellular polyurethane plastic characterized by the following data is obtained:

| | |
|---|---|
| Rising time: 90 sec.; | Setting time: 180 sec.; |
| Bulk density: 605 kg/m³; | Impact elasticity: 61% |
| (DIN 53 512). | |
| Compression set: | at room temperature 5% |
| (DIN 53 517) | at 70° C. 9%. |

*DABCO is a registered trademark of Air Products & Chemicals for triethylene diamine.

What is claimed is:

1. A process for the preparation of polyurethane plastics comprising reacting
    (a) organic polyisocyanates;
    (b) compounds containing at least 2 Zerewitinoff-active hydrogen atoms and having molecular weights of from 400 to 10,000; and
    (c) chain extenders, characterized in that 1,4-3,6-dianhydro-hexites are used as the chain extenders.

2. A process according to claim 1, characterized in that short-chained compounds containing at least 2 Zerewitinoff-active hydrogen atoms and having a molecular weight of from 32 to 400 are used as co-chain extenders.

3. A process according to claim 1, characterized in that catalysts, blowing agents and other known additives are used.

4. A process according to claim 1, characterized in that short-chained compounds containing at least 2 Zerewitinoff-active hydrogen atoms and having a molecular weight of from 32 to 400 and catalysts, blowing agents and other known additives are used.

5. A process according to claim 1 characterized in that there are used as the dianhydro-hexites,
    (a) 1,4-3,6-dianhydro-D-sorbitol corresponding to the formula

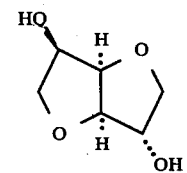

and/or
    (b) 1,4-3,6-dianhydro-D-mannitol corresponding to the formula

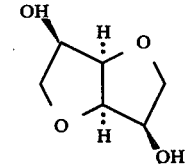

6. A process according to claim 1, characterized in that mixtures of dianhydro-hexites with lower molecular polyols having a molecular weight of from 62 to 400 are used as chain extenders.

7. A process according to claim 1, characterized in that mixtures of dianhydro-sorbitol and 1,4-butane diol are used as chain extenders.

8. A process according to claim 1, characterized in that mixtures of dianhydro-mannitol and 1,4-butane diol are used as chain extenders.

9. A process according to claim 1, characterized in that ternary mixtures of 1,4-3,6-dianhydro-D-sorbitol, 1,4-3,6-dianhydro-D-mannitol and 1,4-butane diol are used as chain extenders.

* * * * *